(12) United States Patent
Ratts et al.

(10) Patent No.: US 11,015,502 B2
(45) Date of Patent: May 25, 2021

(54) THERMAL MANAGEMENT LIGHTOFF ASSIST SYSTEMS AND METHODS FOR REGENERATING OXIDATION CATALYST IN EXHAUST SYSTEM

(71) Applicant: Caterpillar Inc., Deerfield, IL (US)

(72) Inventors: Joshua Lynn Ratts, East Peoria, IL (US); Wilce Damion Williams, San Antonio, TX (US)

(73) Assignee: Caterpillar Inc., Peoria, IL (US)

( * ) Notice: Subject to any disclaimer, the term of this patent is extended or adjusted under 35 U.S.C. 154(b) by 22 days.

(21) Appl. No.: 16/388,338

(22) Filed: Apr. 18, 2019

(65) Prior Publication Data

US 2020/0332690 A1  Oct. 22, 2020

(51) Int. Cl.
| | |
|---|---|
| F01N 3/08 | (2006.01) |
| F01N 3/20 | (2006.01) |
| F01N 3/10 | (2006.01) |
| F01N 13/00 | (2010.01) |
| F01N 3/035 | (2006.01) |

(52) U.S. Cl.
CPC .......... *F01N 3/0885* (2013.01); *F01N 3/2066* (2013.01); *F01N 3/035* (2013.01); *F01N 3/103* (2013.01); *F01N 3/106* (2013.01); *F01N 3/2033* (2013.01); *F01N 13/0093* (2014.06); *F01N 2260/04* (2013.01)

(58) Field of Classification Search
CPC ...... F01N 3/0885; F01N 3/206; F01N 3/2066; F01N 3/2033; F01N 3/106; F01N 3/035; F01N 3/103; F01N 13/0093; F01N 2260/04; F01N 2610/02; F01N 2610/03; F01N 2610/04; F01N 2610/05; F01N 2610/06; F01N 2610/146
USPC .......... 60/274, 286, 295, 297, 299–301, 311
See application file for complete search history.

(56) References Cited

U.S. PATENT DOCUMENTS

| | | |
|---|---|---|
| 7,165,393 B2 | 1/2007 | Betta et al. |
| 7,251,929 B2 | 8/2007 | Hu et al. |
| 7,389,638 B2 | 6/2008 | Weissman et al. |
| 7,926,263 B2 | 4/2011 | Stroh et al. |
| 8,459,010 B2 | 6/2013 | Hancu et al. |
| 9,132,386 B2 | 9/2015 | Udd et al. |
| 10,100,689 B2 | 10/2018 | Kale et al. |
| 2010/0186394 A1 | 7/2010 | Harrison et al. |
| 2010/0326059 A1 | 12/2010 | Mital et al. |
| 2011/0283680 A1* | 11/2011 | Gekas .............. B01D 53/944 60/274 |
| 2014/0363358 A1* | 12/2014 | Udd ................ B01D 53/9431 423/212 |

\* cited by examiner

*Primary Examiner* — Audrey K Bradley
*Assistant Examiner* — Dapinder Singh
(74) *Attorney, Agent, or Firm* — Brannon Sowers & Cracraft

(57) ABSTRACT

A compression ignition internal combustion engine system includes an engine and an exhaust system with an upstream exhaust conduit, and an oxidation catalyst device (DOC). Systems and methods of desulfating the oxidation catalyst by the injection of a lightoff fluid to promote ignition of uncombusted fuel in the exhaust stream are disclosed.

11 Claims, 2 Drawing Sheets

THERMAL MANAGEMENT LIGHTOFF ASSIST SYSTEMS AND METHODS FOR REGENERATING OXIDATION CATALYST IN EXHAUST SYSTEM

TECHNICAL FIELD

The present disclosure relates generally to treating internal combustion engine exhaust, and more particularly to introducing a substance ignited at a lower temperature than a fuel in the exhaust stream, to generate heat locally at or near an emissions reduction device to light off the fuel.

BACKGROUND

Exhaust aftertreatment systems have been used for many years for the reduction of certain emissions in exhaust from internal combustion engines. Combustion of a fuel and air within engine cylinders produces a variety of emissions, including water, carbon dioxide, particulate matter including soot and ash, unburned hydrocarbons, and oxides of nitrogen (NOx). Various regulations have been put in place over the years to limit output of certain emissions, notably particulate matter and NOx. Manufacturers of engines and related systems have devised a great many different strategies for limiting discharge of particulate matter, NOx, and other exhaust constituents to the environment.

With regard to diesel engines and the like it has become conventional to equip such systems with an oxidation catalyst or Diesel Oxidation Catalyst (DOC) for oxidizing unburned hydrocarbons (HC) and Carbon Monoxide (CO), as well as for oxidizing Nitrogen Oxide (NO) into Nitrogen Dioxide ($NO_2$). It has also become conventional to equip such engine systems with one or more additional emissions mitigation devices such as a particulate filter and a selective catalytic reduction device (SCR). Over time, the catalytic surfaces of a DOC can become contaminated with particulates, residues of uncombusted hydrocarbons, and particularly sulfur compounds, thereby reducing the unit's effectiveness. One method of dealing with such contamination is using engine thermal management to increase exhaust temperatures and thus the temperature of the DOC to, for example, initiate combustion of fuel injected into the exhaust stream to desulfate the catalyst. Such techniques have various advantages and disadvantages, namely, efficiency penalties and/or increased equipment costs, and improvements as well as alternatives are desirable. United States Patent Application No. 20100186394 A1 to Harrison et al. proposes an Exhaust Gas After Treatment Assembly where a plurality of different after treatment components are apparently mounted and/or packaged together.

SUMMARY OF THE INVENTION

In one aspect, an exhaust system includes an upstream exhaust conduit having a raw exhaust inlet arranged to receive exhaust produced by an internal combustion engine, and an exhaust outlet. The exhaust system further includes a downstream exhaust conduit, and fuel delivery device configured to deliver a compression ignition fuel into the exhaust system. An oxidation catalyst (DOC) is arranged fluidly between the upstream exhaust conduit and the downstream exhaust conduit. The exhaust system further includes a lightoff fluid reservoir, and a lightoff fluid delivery device configured to deliver the lightoff fluid into the upstream exhaust conduit to light off the compression ignition fuel.

In another aspect, an internal combustion engine system includes a compression ignition internal combustion engine having a cylinder block with a plurality of combustion cylinders formed therein, and an upstream exhaust conduit arranged to receive exhaust produced by the engine having an exhaust temperature in the upstream exhaust conduit below an ignition temperature of the compression ignition fuel. The internal combustion engine system also includes a fuel delivery device configured to deliver the compression ignition fuel into the exhaust system, and an oxidation catalyst (DOC) arranged fluidly between the upstream exhaust conduit and the downstream exhaust conduit. The internal combustion engine system further includes a lightoff fluid reservoir storing a lightoff fluid having an ignition temperature below the ignition temperature of the compression ignition fuel, and a lightoff fluid delivery device configured to inject the lightoff fluid into the upstream exhaust conduit to lightoff the compression ignition fuel.

In still another aspect, a method for regenerating an oxidation catalyst in an exhaust system for a compression ignition internal combustion engine includes delivering a lightoff fluid into an exhaust conduit of the exhaust system where a temperature of exhaust in the exhaust conduit is below an ignition temperature of a compression ignition fuel and above an ignition temperature of the lightoff fluid. The method further includes igniting the lightoff fluid upstream of or or on an oxidation catalyst (DOC) in the exhaust conduit, and lighting off the compression ignition fuel in the exhaust system based on the ignition of the lightoff fluid. The method still further includes desulfating the oxidation catalyst based on an increase in temperature produced by the lighting off of the compression ignition fuel.

DETAILED DESCRIPTION

Figure 1:
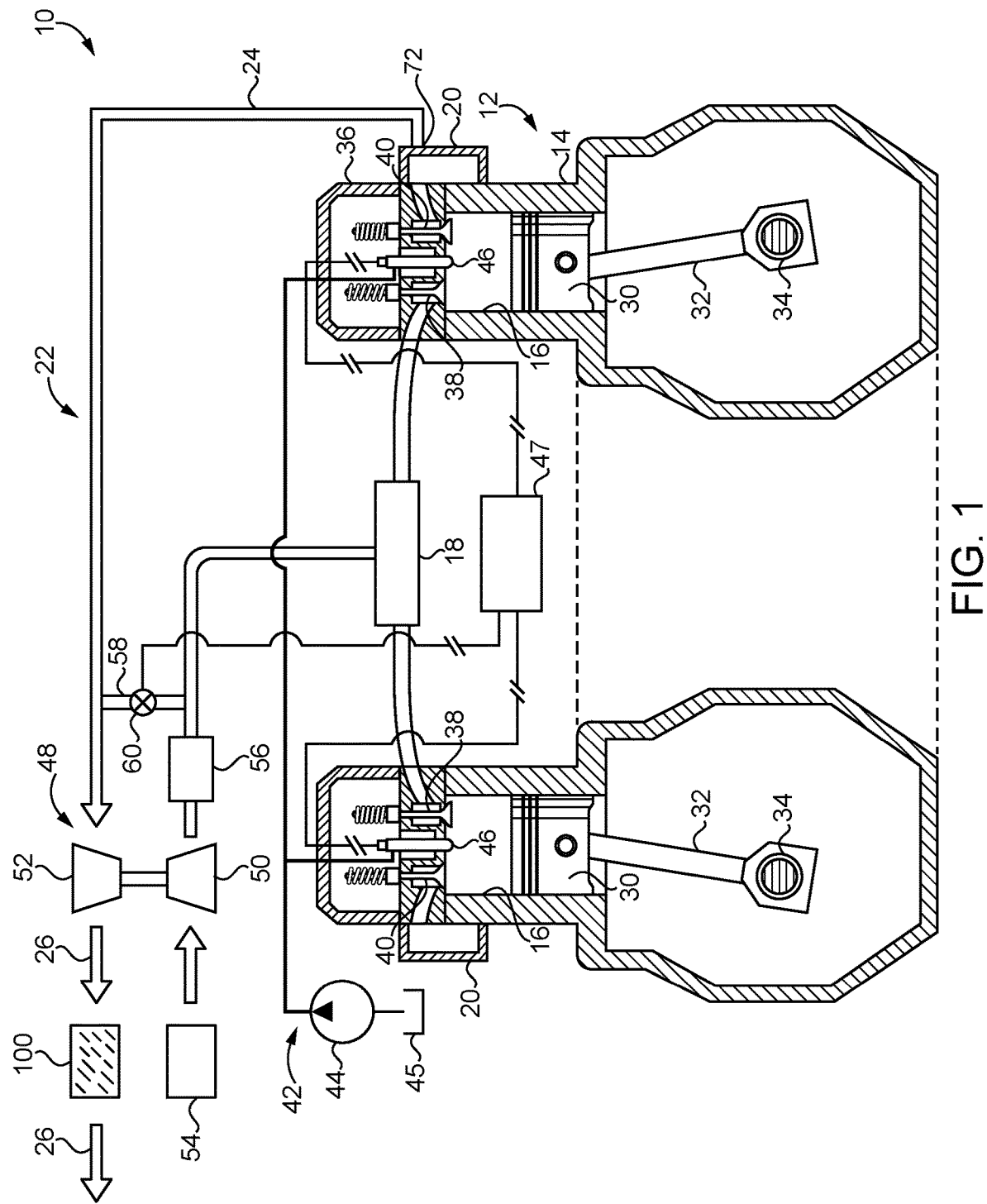
FIG. 1 is a diagrammatic view of an internal combustion engine system, according to the present disclosure.

Referring to FIG. 1, there is shown a compression ignition internal combustion engine system 10, according to one embodiment. Internal combustion engine system 10 (hereinafter "engine system 10") may operate on a liquid compression ignition fuel, such as a diesel distillate liquid fuel, and includes an engine 12 having a cylinder block 14 with a plurality of combustion cylinders 16 formed therein. Engine 12 further includes an intake manifold 18 and an exhaust manifold 20. Combustion cylinders 16 may include any number, arranged in any suitable configuration. A plurality of pistons 30 are positioned one within each of combustion cylinders 16 and are movable, in a four-stroke engine cycle, between a bottom dead center position and a top dead center position to increase a pressure within a corresponding one of combustion cylinders 16 to an autoignition threshold. Each of pistons 30 is coupled with a connecting rod 32 that rotates a crankshaft 34, in a generally conventional manner. Engine 12 further includes a cylinder head 36, with a plurality of intake valves 38 and a plurality of exhaust valves 40 positioned therein and structured to open and close to control gas exchange between combustion cylinders 16 and intake manifold 18 or exhaust manifold 20 as the case may be. In one implementation, each of combustion cylinders 16 is associated with two intake valves 38 and two exhaust valves 40, however, the present disclosure is not thereby limited.

Engine system 10 further includes a fuel system 42 including a fuel pump 44 structured to convey liquid compression ignition fuel from a fuel supply 45 to a plurality of fuel injectors 46 each extending into one of combustion cylinders 16. Fuel pump 44 could be one of a plurality of fuel pumps, including a fuel transfer pump and a high-pressure fuel pump structured to pressurize fuel for supplying to a common rail that feeds fuel injectors 46. Implementations could also include hydraulically-actuated or mechanically-actuated fuel pressurization plungers positioned within or each associated with one of fuel injectors 46. Fuel injectors 46 and other components of engine system 10 can be electronically controlled, and may be controllably coupled with an electronic control unit or ECU 47. Such a control unit may include at least one processor which may include timing functionality such as to be able act as a timer for functions relating to the engine and exhaust system operations, as further discussed herein. Engine system 10 may further include a turbocharger 48 having a compressor 50 structured to receive intake air for combustion from an air inlet 54, and a turbine 52 structured to be rotated by exhaust from engine 12. An aftercooler 56 for compressed intake air may be positioned downstream of compressor 50. An exhaust gas recirculation loop or EGR conduit 58 fluidly connects intake manifold 18 with exhaust manifold 20. An electronically controlled EGR valve 60 may be positioned at least partially within EGR conduit 58. In other examples, the engine system may include a supercharger rather than a turbocharger, or no forced-induction devices at all.

Engine system 10 further includes an exhaust system 22 having an upstream exhaust conduit 24, and a downstream exhaust conduit 26. Upstream exhaust conduit 24 may further have a raw exhaust inlet 72 arranged to receive raw exhaust from exhaust manifold 20, and a raw exhaust outlet 74 which delivers raw exhaust to a Diesel Oxidation Catalyst device 100 (DOC). In this example, "raw exhaust" refers to untreated exhaust, having an exhaust composition substantially identical to a composition of exhaust expelled from cylinders 16, although other substances can be added to and carried with the raw exhaust downstream of engine 12 as further discussed herein. DOC 100 is arranged fluidly between upstream exhaust conduit 24 and downstream exhaust conduit 26, which may include or be coupled with downstream aftertreatment catalysts or devices such as a particulate filter, NOx reduction catalysts such as for selective catalytic reduction, (SCR), or others. Downstream exhaust conduit 26 may further include a diesel exhaust fluid (DEF) or reductant inlet positioned fluidly between DOC 100 and any downstream aftertreatment devices, and structured to receive injected DEF, such as urea water or another suitable reductant, by way of a reductant injector coupled with a reductant storage tank. As used herein, the term "upstream" means toward engine 12, whereas "downstream" means an opposite direction toward a tailpipe of engine 12, with respect to exhaust and flow.

Figure 2:
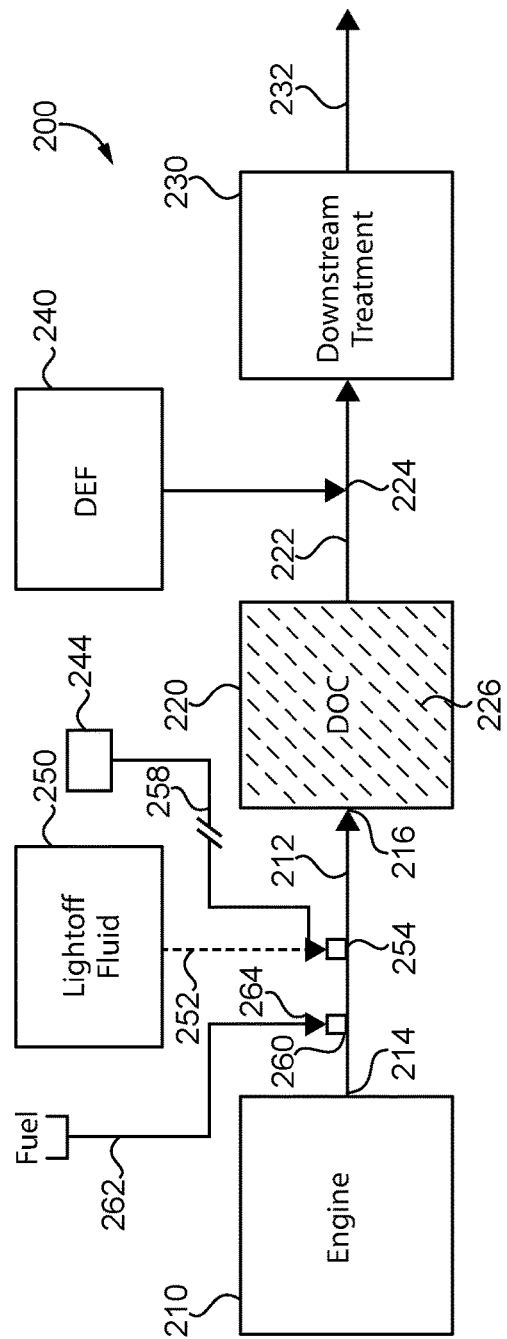
FIG. 2 is a block diagram of one thermal management system and engine according to the present disclosure.

Referring to FIG. 2 there is shown a block diagram of a thermal management system 200 and engine 210 according to one example of the present disclosure. Engine 210 is operationally connected to an upstream exhaust conduit 212, which includes a raw exhaust inlet 214 and a raw exhaust outlet 216. It should be appreciated that engine 210 may be engine 12 or may be similar to engine 12, and thermal management system 200 may be part of or similar to exhaust system 22 of FIG. 1. Different reference numerals are used merely for convenience, and it should therefore be appreciated that description of features or functionality of any one embodiment herein shall be understood by way of analogy to refer to any other embodiments, except where otherwise indicated or apparent from the context. Exhaust inlet 214 is configured to receive raw exhaust from engine 210, and exhaust outlet 216 is connected to a DOC device 220 and is configured to deliver exhaust gas from upstream exhaust conduit 212 to DOC 220. DOC 220 may include one or more precious metal catalysts 226 (such as, but not limited to, platinum group or PGM metals) for catalytic oxidation of compounds in the exhaust gasses, as discussed above, and is connected to a downstream exhaust conduit 222 in turn connected to downstream treatment devices 230 such as particulate filters, NOx reduction catalysts, or others. Disposed between DOC 220 and downstream treatment devices 230 along downstream exhaust conduit 222 may be a diesel exhaust fluid (DEF) or reductant inlet 224 structured to receive injected DEF by way of an injector (not shown) coupled to a DEF or reductant storage tank 240. Downstream treatment devices 230 are connected to a final exhaust conduit 232 which may convey the treated exhaust gasses to a tailpipe.

Disposed along and formed in upstream exhaust conduit 212 fluidly between exhaust inlet 214 and exhaust outlet 216 is a lightoff fluid inlet 254. Lightoff fluid inlet 254 could be positioned fluidly between engine 210 and a turbine of a turbocharger (not shown). The lightoff fluid inlet 254 is fluidly connected to a lightoff fluid delivery device 256 which may be an injector, or potentially a venturi-type device such as an inspirator, atomizer, or the like. Lightoff fluid delivery device 256 is fluidly connected to a lightoff fluid reservoir 250 by a lightoff fluid conduit 252. Lightoff fluid delivery device 256 may be connected to a computerized control device 244 by a control line 258. Control device 244 might be an engine ECU having a processor, a separate electronic control device, or a timer capable of controlling the frequency, amount, or both, of delivery of lightoff fluid. Lightoff fluid delivery device 256 may directly inject lightoff fluid into upstream exhaust conduit 212, as further discussed herein.

Thermal management system 200 may further include a fuel inlet 260 disposed along and formed in upstream exhaust conduit 212 fluidly between exhaust inlet 214 and lightoff fluid inlet 254. Fuel inlet 260 is fluidly connected to a fuel delivery device 264 configured for delivering fuel into upstream exhaust conduit 212 by way of a fuel line 262 from some point in the vehicle's fuel system (such as the fuel tank, a fuel rail, or the like). Fuel delivery device 264 may be an injector that directly injects compression ignition fuel into upstream exhaust conduit 212 or a venturi-type device such as an inspirator, atomizer, or the like. A fuel delivery device according to the present disclosure could also be one of a plurality of fuel injectors associated with engine 210, similar to the configuration shown in FIG. 1, that delivers a so-called post-injection directly into a cylinder at a late timing, such that uncombusted fuel is then carried downstream from engine 210 into upstream exhaust conduit 212.

Figure 3:
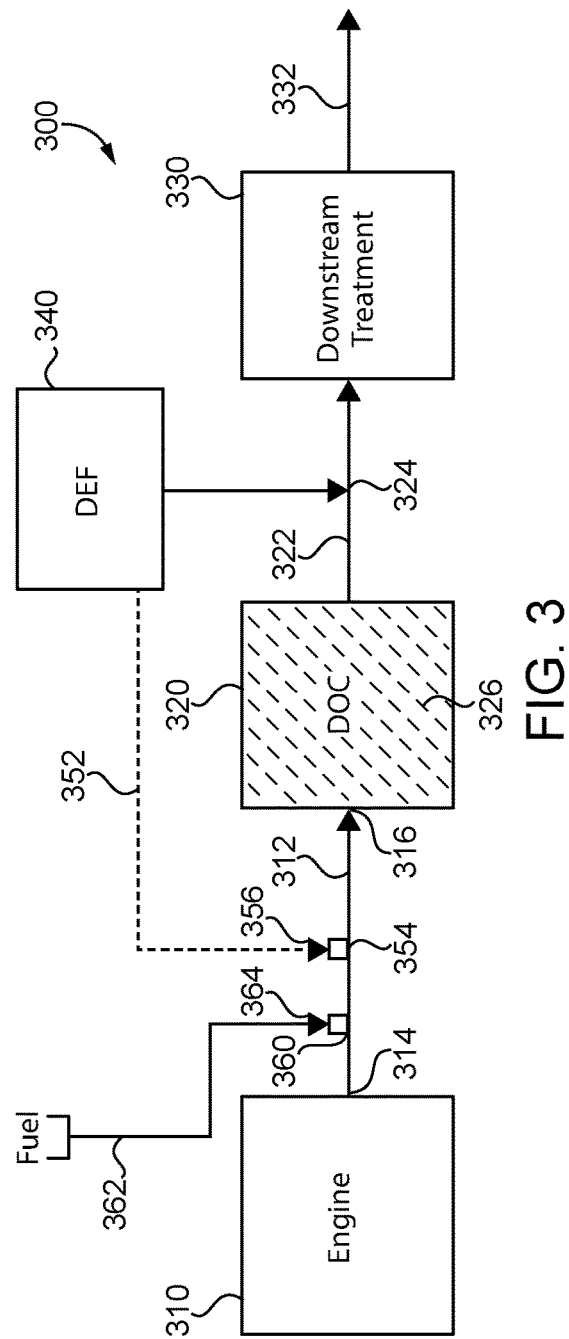
FIG. 3 is a block diagram of another thermal management system and engine according to the present disclosure.

Referring to FIG. 3 there is shown a block diagram of a thermal management system 300 and engine 310 according to another example of the present disclosure. Engine 310 is fluidly connected to an upstream exhaust conduit 312 which includes an exhaust inlet 314 and an exhaust outlet 316. Upstream exhaust inlet 314 is configured to receive raw exhaust from engine 310. Upstream exhaust outlet 316 is fluidly connected to a DOC device 320 to deliver exhaust gas from upstream exhaust conduit 312 to DOC 320. DOC 320 includes one or more precious metal catalysts 326, analogous to the foregoing embodiments, for the catalytic oxidation of compounds in the exhaust gasses and connected to a downstream exhaust conduit 322, in turn connected to downstream treatment devices 330 such as particulate filters, NOx reduction catalysts, or others. Disposed between DOC 320 and downstream treatment devices 330 and formed in downstream exhaust conduit 322 is a DEF or reductant inlet 324 structured to receive DEF injected by way of an injector 356 coupled to a DEF or reductant storage tank 340. Downstream treatment devices 330 are connected to a final exhaust conduit 332, similar to the foregoing embodiments.

Disposed along and formed in upstream exhaust conduit 312 fluidly between exhaust inlet 314 and exhaust outlet 316 is a lightoff fluid inlet 354. Lightoff fluid inlet 354 is fluidly connected to a lightoff fluid delivery device 356, which may be an injector or a venturi-type device such as an inspirator, atomizer, or the like. Lightoff fluid delivery device 356 is fluidly connected to DEF or reductant storage tank 340 by a lightoff fluid conduit 352. Thermal management system 300 may further include a fuel inlet 360 disposed along and formed in upstream exhaust conduit 312 fluidly between the upstream exhaust conduit inlet 314 and lightoff fluid inlet 354. Fuel inlet 360 is fluidly connected to a fuel delivery device 364 configured for introducing a compression ignition fuel into upstream exhaust conduit 312 which is carried by a fuel line 362 from some point in the vehicle's fuel system (such as the fuel tank, a fuel rail, or the like). Fuel delivery device 364 may be an injector or a venturi-type device such as an inspirator, atomizer, or the like.

INDUSTRIAL APPLICABILITY

Thermal management systems may utilize uncombusted compression ignition fuel (such as diesel fuel, biodiesel fuel, and/or combinations thereof) injected into the exhaust such as by introducing fuel into the combustion cylinders after the expansion stroke and/or by introducing fuel such as by direct injection into the exhaust stream upstream of the DOC. In such systems, the catalytic surfaces in the DOC can become sulfated by sulfur compounds in fuel delivered into the exhaust. A sulfated DOC operates less efficiently, which can negatively impact not only performance of the DOC but also performance of other aftertreatment systems located downstream of the DOC. Normally this problem is solved by raising the temperature of the exhaust stream entering the DOC to reach at least the minimum lightoff temperature of the fuel and initiate a thermal management event, however, such a remedy can have drawbacks such as requiring an additional mechanism to raise and/or maintain higher exhaust temperatures, and an efficiency penalty in at least some instances.

According to the present disclosure, a lightoff fluid is introduced to the exhaust stream prior to the DOC. The lightoff fluid has a lower ignition temperature than the compression ignition fuel being used in the engine (e.g., diesel fuel). Ignition and combustion of the lightoff fluid prior to or at the DOC is believed to locally raise the temperature in or on the DOC to desulfate the DOC catalytic surfaces sufficiently to ignite the compression ignition fuel. The ignition of the compression ignition fuel can increase temperature of the DOC to fully regenerate the DOC. The exhaust temperature can itself be increased sufficiently by combustion of the lightoff fluid to ignite compression ignition fuel in the exhaust, or potentially even to desulfate the DOC without the addition of compression ignition fuel. The lightoff fluid may be a gas or a liquid, as desired. Some suitable lightoff fluids include gasses such as CO, $H_2$, $NH_3$, liquids such as ethanol, DEF, and starting fluid (e.g., diethyl ether), and other hydrocarbons which have a lower ignition temperature than diesel fuel, as well as combinations thereof. CO might be produced by operating the engine with reduced oxygen, for instance, to generate excess CO in situ within the engine cylinders.

The timing and amount of lightoff fluid delivered may vary according to each application. In some examples, the timing of the injection may occur in a predetermined timing interval (e.g., from about 50 to about 100 hours of engine operation) or at a predetermined timing (e.g., every 70 hours of engine operation) such as by using a timer operationally connected to the lightoff fluid injector. The term "about" is used herein in the context of conventional rounding, hence, "about 50" means from 45 to 54. In other examples, timing of the delivery may be determined automatically by an on-board computer system using sensor data. A map might be stored on ECU 47 that enables determining a suitable timing based on empirically derived standards such as DOC sulfation rates, engine and exhaust system operating history, or other factors. In still other examples, injection of the lightoff fluid could be initiated manually by an operator. The timing of such injections may also be related to the timing frequency of dosing the exhaust system with uncombusted compression ignition fuel, such as injecting lightoff fluid at a timing frequency that is less than a timing frequency of dosing of the exhaust system with fuel.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An exhaust system, comprising:
   an upstream exhaust conduit having a raw exhaust inlet arranged to receive exhaust produced by an internal combustion engine, and a raw exhaust outlet;
   a downstream exhaust conduit;
   a fuel delivery device configured to deliver a compression ignition fuel into the exhaust system at a location upstream of the raw exhaust outlet;
   an oxidation catalyst (DOC) arranged fluidly between the upstream exhaust conduit and the downstream exhaust conduit;
   a lightoff fluid reservoir; and
   a lightoff fluid delivery device configured to deliver a lightoff fluid into the upstream exhaust conduit at a location upstream of the raw exhaust outlet, to lightoff the compression ignition fuel.

2. The exhaust system of claim 1 wherein the lightoff fluid includes
   at least one of CO, $H_2$, $NH_3$, ethanol, and ether, and Diesel Exhaust Fluid (DEF).

3. The exhaust system of claim 1 further comprising a lightoff fluid delivery port formed in the upstream exhaust conduit, and a timer, and the lightoff fluid delivery device is coupled with the timer and configured to directly inject the lightoff fluid through the lightoff fluid delivery port at a timing interval.

4. The exhaust system of claim 3 wherein the timing interval is from about 50 hours to about 100 hours of operation of the compression ignition internal combustion engine.

5. The exhaust system of claim 3 further comprising a fuel delivery port in the upstream exhaust conduit and located upstream of the lightoff fluid delivery port, and the fuel delivery device is coupled with the fuel delivery port.

6. The exhaust system of claim 1 further comprising a particulate filter and a NOx reduction catalyst each within the downstream exhaust conduit, and a diesel emission fluid (DEF) delivery device coupled with the downstream exhaust conduit at a location upstream of the NOx reduction catalyst.

7. The exhaust system of claim 1 wherein the lightoff fluid includes at least one of CO, $H_2$, $NH_3$, ethanol, or ether.

8. An internal combustion engine system comprising:
a compression ignition internal combustion engine including a cylinder block having a plurality of combustion cylinders formed therein;
an upstream exhaust conduit arranged to receive exhaust produced by the compression ignition internal combustion engine, and having an exhaust temperature in the upstream exhaust conduit below an ignition temperature of a compression ignition fuel, the upstream exhaust conduit having a raw exhaust inlet and a raw exhaust outlet;
a downstream exhaust conduit;
a fuel delivery device configured to deliver the compression ignition fuel into the exhaust system at a location upstream of the raw exhaust outlet;
an oxidation catalyst (DOC) arranged fluidly between the upstream exhaust conduit and the downstream exhaust conduit;
a lightoff fluid reservoir storing a lightoff fluid having an ignition temperature below the ignition temperature of the compression ignition fuel; and
a lightoff fluid delivery device configured to deliver the lightoff fluid into the upstream exhaust conduit at a location upstream of the raw exhaust outlet to lightoff the compression ignition fuel for igniting the compression ignition fuel.

9. The internal combustion engine system of claim 8 wherein the lightoff fluid includes at least one of CO, $H_2$, $NH_3$, ethanol, ether, and Diesel Exhaust Fluid (DEF).

10. The internal combustion engine system of claim 8 further comprising a lightoff fluid delivery port formed in the upstream exhaust conduit, and a fuel delivery port located in the upstream exhaust conduit at a location that is upstream of the lightoff fluid delivery port.

11. An exhaust system, comprising:
an upstream exhaust conduit having a raw exhaust inlet arranged to receive exhaust produced by an internal combustion engine, and an exhaust outlet;
a downstream exhaust conduit;
a fuel delivery device configured to deliver a compression ignition fuel into the exhaust system;
an oxidation catalyst (DOC) arranged fluidly between the upstream exhaust conduit and the downstream exhaust conduit;
a lightoff fluid reservoir;
a lightoff fluid delivery device configured to deliver a lightoff fluid into the upstream exhaust conduit to lightoff the compression ignition fuel;
a lightoff fluid delivery port formed in the upstream exhaust conduit, and a timer, and the lightoff fluid delivery device is coupled with the timer and configured to directly inject the lightoff fluid through the lightoff fluid delivery port at a timing interval from about 50 hours to about 100 hours of operation of the compression ignition internal combustion engine.

* * * * *